Feb. 7, 1950     W. E. BRADLEY     2,496,772
CAVITY RESONATOR
Filed July 12, 1944     3 Sheets-Sheet 1
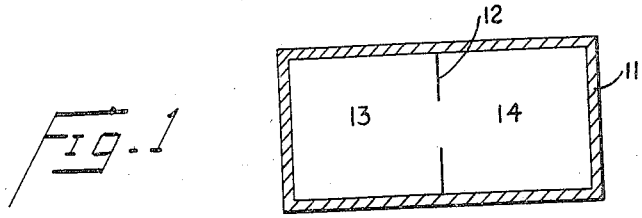
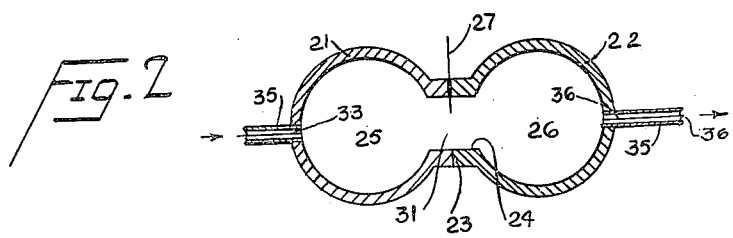
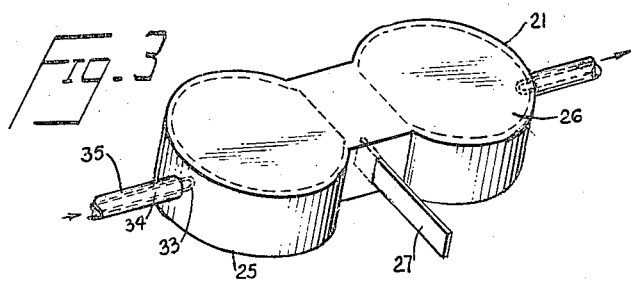
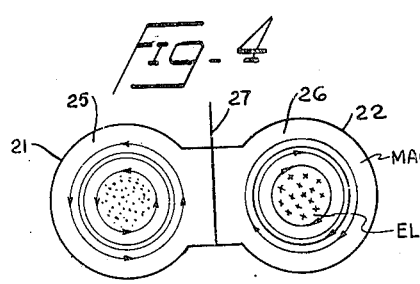
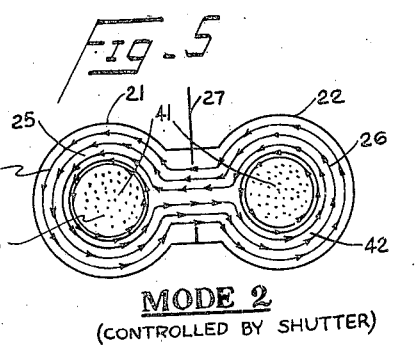
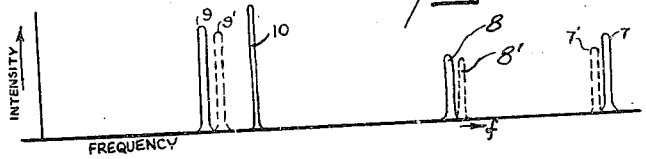
INVENTOR.
William E. Bradley
BY
Samuel Atrolenk
attorney.

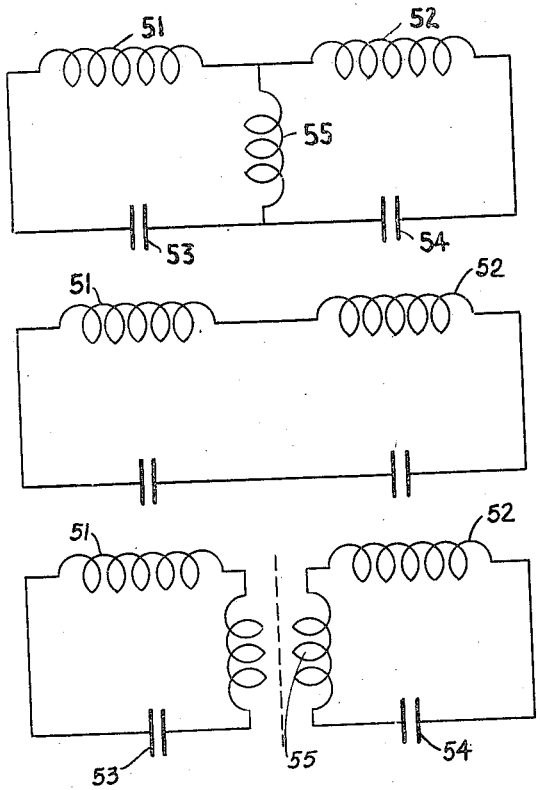
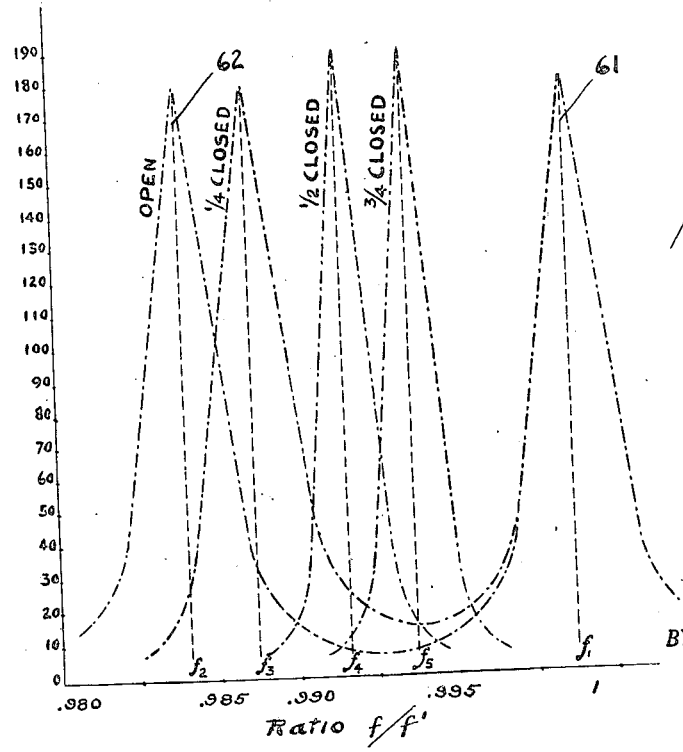

Feb. 7, 1950
W. E. BRADLEY
CAVITY RESONATOR
2,496,772
Filed July 12, 1944
3 Sheets-Sheet 3
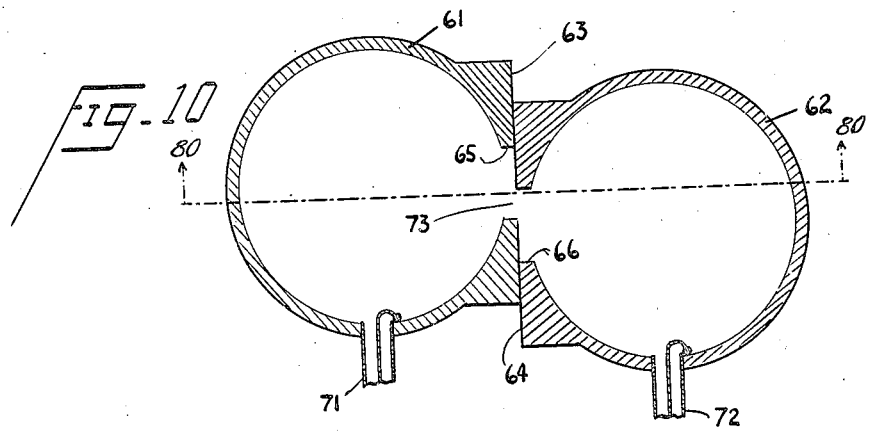
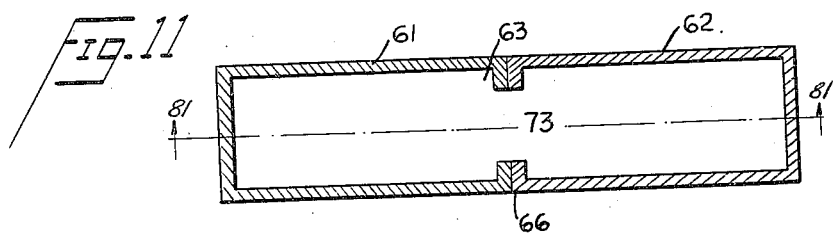
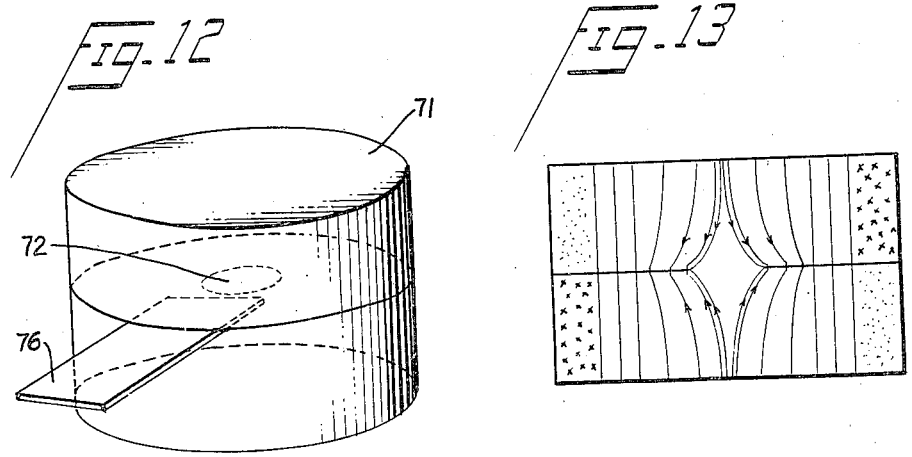
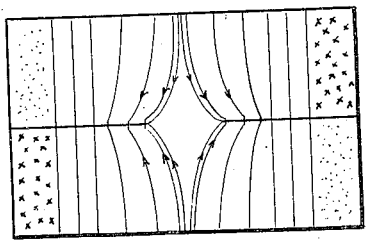
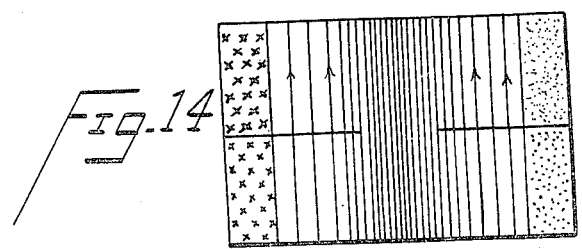
INVENTOR.
William E. Bradley
BY
Samuel Ostrolenk
attorney Patented Feb. 7, 1950

2,496,772

UNITED STATES PATENT OFFICE 2,496,772

CAVITY RESONATOR

William E. Bradley, Swarthmore, Pa., assignor, by mesne assignments, to Philco Corporation, Philadelphia, Pa., a corporation of Pennsylvania Application July 12, 1944, Serial No. 544,575

11 Claims. (Cl. 178—44)

My invention relates in general to the field of ultra-high frequency signalling, and more particularly concerns a novel and improved cavity resonator.

In ultra-high frequency signal systems, resonance is usually established by hollow metal cavity resonators suitably coupled to the high frequency generating systems. These cavity resonators act in a manner comparable to the tuned tank circuits utilized at the lower frequencies. The resonant frequency of a cavity is, in general, fixed and a function of the resonator geometry and the coupling system utilized.

It is possible, as is well understood, to excite various modes of oscillation at various frequencies in a single cavity resonator. However, these modes are fixed by the geometry of the apparatus, and a change in the cavity configuration will generally result in a corresponding change in all possible modes. Tuning of one mode in a cavity resonator independently of another mode therein has heretofore been impractical.

In certain ultra-high frequency applications, such as radio ranging and the like, it is particularly desirable to be able to independently tune a single mode of oscillation in a cavity resonator while another mode of resonance remains substantially stable over a comparatively wide range of tuning for the first mentioned mode.

In general, I have discovered that if a cavity resonator is excited with any one mode of resonance, that this is in no way interfered with if a thin metal barrier is inserted in the field such that at all points it is parallel to the magnetic field and normal to the electric field therein. This is true because such a barrier still permits all electric lines to remain normal to the metal surfaces and all magnetic lines parallel thereto; these conditions being theoretically requisite in all cavities.

Since all cavities have various possible resonances, some of which are close together in the frequency band, it is possible by proper excitation to obtain more than one resonance condition in the cavity. The field patterns for the different possible resonances mentioned are, as is well known, dissimilar. Therefore the barrier which at all points is normal to the electric field and parallel to the magnetic field of one of these modes will not be normal to the previously existing electric field and parallel to the previously existing magnetic field of another mode.

The insertion of a metal member, such that it disturbs the field of a particular mode in any cavity will result in a change of the frequency to which the mode is resonant. This is the principle of well known tuning devices for cavities, as screw plugs and the like.

In accordance with my invention, therefore, the insertion of a thin metal member in a cavity is utilized to change one possible excitation frequency while in no manner affecting another. That is, by inserting the metal member such that at all degrees of adjustment thereof it remains parallel to the magnetic field and normal to the electric field of one mode of resonance (which will therefore remain unaffected), it will automatically disturb the field pattern of all other possible modes of resonances of that particular cavity (which are therefore affected). The member thereby functions as a tuning control for at least one mode of resonance in the cavity. One other mode of resonance is completely unaffected by the insertion of the barrier in this manner.

In carrying out a more specific application of this discovery, I have found that by suitably constructing a cavity resonator with a plurality of chambers, I could obtain a fixed resonance mode, and a tunable mode such that tuning of the latter mode would not affect the former.

Generally speaking, if a cavity resonator is divided into two sections by an extremely thin sheet of metal, the result will be two cavity resonators, each of which has an independent resonant frequency. I have observed that if the partition which separates the two cavities is partially removed, an additional mode of oscillation is obtainable. The frequency of the new mode of oscillation resulting from the cross-coupling between the two original cavities may be higher or lower in frequency than the single fixed mode of oscillation initially present.

The partial removal of the partition between the two cavities, however, does not disturb the original resonant frequency because the partition is positioned normal to the original electric field and parallel to the original magnetic field.

If the partition opening between the two cavities is in a region of high magnetic field, the new mode of oscillation between the two cavities will be of a lower frequency and if in a region of high electric intensity, will be of a higher frequency than the original mode.

A cavity resonator having a fixed mode of oscillation and an adjustable mode of oscillation has important application in present ultra-high frequency signalling systems, as for example in two band reception.

This type of cavity resonator is somewhat analogous to an electric circuit which is doubly tuned and resonant at two distinct frequencies. Such an equivalent electric circuit may comprise tuned coils which in turn are coupled through a common inductance. If the coupling inductance of such a network is adjusted, one resonant frequency remains fixed while the other varies. This is comparable to the movement of the partition opening between the two chambers of my cavity resonator, as described, which results in a corresponding change in coupling between the cavities and a frequency variation of one of the resonant modes thereof.

Accordingly, an object of my present invention is to provide a novel ultra-high frequency cavity resonator.

Another object of my present invention is to provide an ultra-high frequency resonator with a fixed mode of oscillation and a tunable mode of oscillation.

A further object of my present invention is to provide a novel cavity resonator having a fixed mode of oscillation, and another mode of oscillation tunable by a movable metal partition.

Another object of my invention is to provide a novel cavity resonator divided into a plurality of chambers separated by an adjustable partition.

These and other objects of my present invention will now become apparent from the following specification taken in connection with the accompanying drawings in which:

Figure 1 is a cross-sectional view of one form of a divided cavity embodying my invention.

Figure 1a is a chart of a typical resonance response for a cavity.

Figure 2 is a cross-sectional view of another cavity resonator having an adjustable partition.

Figure 3 is a perspective view of such a cavity.

Figure 4 is a diagrammatic representation of the electro-magnetic field existing in the divided cavity for the fixed mode of oscillation.

Figure 5 is a diagrammatic representation of the electro-magnetic field of the adjustable mode of oscillation.

Figure 6 is a schematic diagram of an equivalent circuit which may be utilized at lower frequencies for providing a similar frequency response.

Figures 7 and 8 are schematic diagrams of equivalent circuits for each of two modes to which Figure 6 may be tuned.

Figure 9 is a graphical representation of the effect of tuning in a movable partition cavity resonator.

Figure 10 is a cross-sectional view taken along the line 81 of Figure 11 of a modification of a tunable mode cavity resonator.

Figure 11 is a cross section taken along the line 80 of Figure 10.

Figure 12 is a perspective view of a cavity resonator embodying a modification of my invention in which the cavities are arranged in end to end relation.

Figure 13 shows the field distribution of a tunable mode in such a cavity; and

Figure 14 shows the undisturbed field distribution of a fixed mode in such a cavity.

Referring now to Figure 1, there is shown a cavity resonator comprising a hollow metal shell 11. A cavity of this general form will have a plurality of resonant frequencies, as illustrated by the chart in Figure 1a. Assume that the resonator is appropriately excited at frequency 10, the insertion of any thin metal partition such as 12 such that it is at all times parallel to the excited magnetic field and normal to the electric field, the cavity mode of resonance at frequency 10 will not change. However, since the fields for resonances at frequencies 7, 8 and 9 will be different than that for frequency 10, the thin metal plate 12 will disturb these fields, if excited, and accordingly shift each of these resonances to new points, such as 7', 8' and 9'. The extent of partition insertion and the particular location thereof will determine the magnitude and direction of the frequency shift of frequencies 7, 8 and 9.

In Figure 2 there is shown a practical embodiment of a cavity resonator with an adjustable mode of oscillation. The resonator comprises essentially two symmetrically disposed metal shells 21 and 22.

Flat shoulders 23 are machined on sections 21 and 22 of the resonator so that the two sections may contact each other as illustrated in Figure 2. Narrow openings 24 cut in the walls of the shoulders 23 provide a communicating passage between the two resonating cavities 25 and 26.

The upper shoulders of the shells 21 and 22 are spaced to permit the insertion of a slidable partition 27 of a thin highly conductive metal, so positioned that there is electrical symmetry about the plane of the partition. This partition 27 may be mounted upon a suitable adjusting screw, not shown, and is utilized to vary the coupling opening 31 between the two cavities 25 and 26. The cavity may be excited at its normal resonant mode by probes or by small loops inserted into the spaces 25 and 26. As illustrated, these loops are formed by wires 33 and 36, between the inner conductors 34 and the shields 35 of feeding coaxial cables.

The electro-magnetic field configurations existing in each of the two cavities 25 and 26 with a closed partition when loops 33 and 36 are energized at frequency 10, is illustrated in Figure 4. Here the metal shells 21 and 22 are schematically illustrated as circles with the partition 27 completely separating the space between the two cavities 25 and 26. The electric field lines in each of the chambers 25 and 26 are perpendicular to the plane of the cross-section shown, and the magnetic field lines are circular and in the plane of the cross-section illustrated. The electric field lines in one chamber 25 are in the opposite direction from the electric field lines in the other chamber 26. Also, the direction of the circular magnetic field in cavity 26 is opposite that of the circular magnetic field in cavity 25. This field configuration, shown in Figure 4, will be associated with oscillation at the natural resonant frequency of each of the cavities.

If now the partition 27 is partially removed, as illustrated in Figure 2, the electro-magnetic fields in the cavities 25 and 26 are unaffected for reasons described above. However, it is now possible to excite a new mode of oscillation in these cavities having a slightly different resonant frequency as well as the first excited mode described in connection with Figure 4. The new mode is actually very close to frequency 10 for small openings of the barrier, as for example, frequency 9 in Figure 1a. The field pattern of the second mode alone is shown in Figure 5. Here the metal shells 21 and 22 and the chambers 25 and 26 are schematically illustrated, as in Figure 4. The electro-magnetic field lines illustrated in Figure 5 are those which are formed only by the supplementary mode of oscillation which may be excited after removing part of the partition 27.

Either mode may be excited by either loop alone except when the partition is completely closed.

The electric field lines 41 in Figure 5 in each cavity 25 and 26 are in the same direction but still perpendicular to the plane of the cross-section shown. The magnetic field lines are essentially circular but some of them link the electric field lines through the opening between the two cavities. It is to be understood that, during the oscillation in the cavity resonator shown in Figure 2, when the partition 27 is partly opened both of the field configurations shown in Figures 4 and 5 may exist simultaneously, or singly, dependent upon the frequency of the excitation. When both signals do occur simultaneously, the component of the field illustrated in Figure 4 remains fixed despite the movement of the partition 27, whereas the field lines shown in Figure 5 will change with the movement of the partition 27 and coincide with the former when completely closed. The combined resonant characteristic of both modes of oscillation thus results in one fixed frequency of resonance and one variable frequency of resonance.

The opening 31 between the cavities 25 and 26 may, of course, be positioned at any point along the boundary between the two cavity sections. This change of position will control the frequency, and I have found that if the opening is in a region of high magnetic field intensity, the secondary mode of oscillation will be lower in frequency than the fixed mode of oscillation. If on the other hand the opening in the partition is in a region of high electric field stress, the secondary mode will be of a higher frequency than the fixed non-tunable mode.

Effectively, this type of cavity resonator is analogous to a double tuned circuit, as in Figure 6. It is to be understood, of course, that construction of such an equivalent circuit is not feasible for the ultra-high frequency range covered by the cavity resonator shown in Figure 2. The equivalent circuit illustrated in Figure 6 comprises the matched coils 51 and 52 tuned by identical condensers 53 and 54, respectively. An inductance 55 joins the common point of coils 51 and 52 to the common point between the condensers 53 and 54.

This circuit has two resonant frequencies as determined by first, the natural frequency of a single inductance, as 51 or 52, and condenser, as 53 or 54, and second, by the total inductance 52 and twice the inductance of 55 and a single condenser as 54. If the inductance 55 is varied, the first resonant frequency of the circuit shown in Figure 6 will be unaffected. However, the second resonant frequency may be adjusted thereby and corresponds in effect to the phenomenon described in connection with the movable partition cavity resonator of Figure 2.

The response characteristics of a cavity resonator of the type illustrated in Figure 2, is graphically shown in Figure 9. The curve represents the experimentally determined relative response of such a cavity resonator over a band of frequencies in the ultra-high frequency spectrum. A resonance peak 61 is obtained at a frequency $F_1$ and represents the first untunable mode of oscillation of the cavity resonator. A second resonance peak 62 is obtained at a frequency $F_2$ which is lower than frequency $F_1$. This second mode $F_2$ occurs when the partition 27 is completely removed so that maximum coupling exists between the two chambers 25 and 26. As the partition 27 is slowly inserted into the space between the two chambers 25 and 26, the frequency of the second mode rises while the first mode stays fixed at the peak 61, or frequency $F_1$. Thus, with the partition ¼ closed, a resonance peak at frequency $F_3$ is obtained, in addition to the resonance peak at frequency $F_1$. For the partition ½ closed, a resonance peak is obtained at frequency $F_4$. It is clear therefore, that two resonance peaks are generally obtained; one of which is fixed in the frequency spectrum, and the other of which may be continuously shifted along the frequency spectrum.

If the latter resonance peak is brought very close to the fixed resonance peak 61, then the conventional doubly peaked broad band resonance curve is obtained in a manner similar to that obtained with a doubly tuned coupled circuit.

The doubly tuned cavity resonator illustrated in Figure 2, may of course be subject to various designs for specific practical application. For instance I have found that different arrangements of couplers may be utilized. A further illustration of this is shown in Figure 12 in which two cavities are shown placed end to end with a variable opening in the connecting end. A single coupling device may serve to replace the two probes shown in Figure 2. The partition may comprise an iris diaphragm for convenience in manipulation. When the coupling units and the cavities are symmetrical, then the input and output couplers may, if desired, be reversed.

If it is desired to maintain the coupling opening at the center of the cavity, then two opposed moving partition members such as 27 may be inserted.

Another embodiment of a cavity resonator having the properties described in connection with that shown in Figure 2, is illustrated in Figures 10 and 11, in which Figure 10, is a sectional view taken along sectioning line 81 in Figure 11, and Figure 11 is a sectional view taken along sectioning line 80 in Figure 10. Two cavities are formed by the hollow cylindrical metallic members 61 and 62 machined flat along contacting surfaces 63 and 64 respectively. Openings 65 and 66 in the flat walls of the contacting chambers are normally aligned.

Coupling connectors 71 and 72 consisting of loop terminations of coaxial cables are provided for the two chambers. These connectors are energized as described in connection with the cavity shown in Figure 2.

Mechanical means, not shown, are provided so that the two chambers may be moved over the contacting surfaces 63 and 64. In this manner, the coupling opening 73 between the two cavities is uniformly adjustable from completely open to completely closed. The opening 73 obviously remains symmetrically positioned between the two chambers.

Thus by a variation in the relative positioning of the two members 61 and 62, one mode of oscillation may be tuned. The other mode as previously described remains relatively fixed.

In Figure 12 I have shown a cavity 74 provided with an opening 75 between two sections of the cavity. An adjustable plate 76 is so positioned in the field set up by one of the modes of oscillation to which the cavity is resonant that it is in all degrees of adjustment therein parallel to the magnetic field and normal to the electric field of the particular mode of resonance which would obtain in the path of the barrier, as shown in Figure 14. The movement of plate 76 will therefore leave tuning of the cavity unaffected as to this mode. At least one other mode of resonance such as that illustrated in Figure 13 is varied in resonant frequency in accordance with the degree of adjustment of the plate in the manner described in detail hereinbefore.

It will be noted that in the modification illustrated in Figures 2 to 5, the plate is inserted in a region of high magnetic field intensity and the variable mode of oscillation will accordingly resonate at a lower frequency than the original mode as explained above.

On the other hand, the plate of Figures 12 to 14 is inserted in a region of high electric field intensity and accordingly in this modification, the variable mode of oscillation will resonate at a higher frequency than the original mode.

In the above I have illustrated my invention applied to double cavity resonators. It will now be obvious however that these are only specific applications of my invention and that the particular shape and size of the cavity or adjustable metallic member inserted in the cavity may be varied so long as the rule is followed that at all degrees of adjustment of the metal member it is parallel to the magnetic and normal to the electric fields of the desired fixed mode of oscillation and is relatively thin.

In the particular illustrations here employed in describing my invention, I have shown a double cavity which may be a double cavity T. R. box commonly employed in radar, with input and outputs at its opposite ends. In such a system, it is often desirable that aircraft provided with a radar equipment be able to use the radio equipment for receiving beacon signals to take bearings while still keeping the apparatus instantly available for radar signalling. In accordance with my invention, it is possible for the radio operator to receive beacon signals by tuning his T. R. box to the beacon signal while the double cavity T. R. box remains resonant to the radar frequencies.

Thus, since various modifications of the illustrated cavity resonator may now become apparent to those skilled in the art, I prefer that this disclosure be bound not by the specific description given above, but by the appended claims.

I claim:

1. In an electrical system comprising a resonant cavity, means for establishing with said cavity an electromagnetic field associated with at least two distinct modes of resonance of said cavity, a thin adjustable conducting member, said member being located and inserted in said cavity along a plane in which all degrees of its adjustment are normal to the electric field and parallel to the magnetic field which would obtain in the path of the member but with the member completely withdrawn, said field being associated with one of said modes of resonance of the cavity, the resonant condition of said cavity to said mode being unaffected by the adjustment of said member, its other mode being varied in resonant frequency in accordance with the degree of adjustment of said member.

2. In an electrical system comprising a resonant cavity, means for establishing in said cavity an electromagnetic field associated with at least two distinct modes of resonance of said cavity a thin adjustably movable plane conducting member having an opening and being slidably mounted in said cavity intermediate the ends of said cavity so that it is everywhere thereof and at all degrees of adjustment thereof normal to the electric field and parallel to the magnetic field associated with a particular mode of resonance of the cavity when said cavity is excited at said resonant frequency.

3. In combination, a first cavity joined to each other and having an opening at said joint and a second cavity; said cavities having a fixed mode of oscillations and a variable mode of oscillations; a plane conductive partition adjustable in a plane between said cavities, said partition having an opening for coupling said cavities, the partition being slidably mounted in said opening and being adjustable in a plane in which it does not effect the electric and magnetic fields of the fixed mode of oscillations and changes the coupling to correspondingly shift the frequency adjustable mode of resonant frequency while the frequency fixed mode of oscillations remains unchanged the opening between said cavities having a magnitude such that the uneffected mode extends therethrough from said first to said second cavity.

4. A resonator comprising two symmetrical metal shells forming two resonating cavities and having flat opposed surfaces in which there is a narrow opening providing a communicating passage between the resonating cavities; said flat opposed surfaces being spaced from each other, and a slidable partition of a thin highly conductive metal mounted in said space and movable to vary the coupling between said cavities; and means including loops symmetrically positioned in said cavities for exciting said cavities at a particular mode of oscillations and setting up electric fields in each cavity normal to the plane of said metal spacer the resonance condition of said cavity to said mode being uneffected by the adjustment of said partition, said means also exciting said cavity at at least a second mode of oscillations, said partition varying the resonance frequency of said cavity with respect to said second mode as said partition is adjusted.

5. In an electrical system, a resonant cavity, means for establishing within said cavity an electromagnetic field associated with at least two distinct modes of resonance of said cavity, a thin conductive member extending into said cavity and adapted to alter said electromagnetic field, the path of adjustment of said barrier being in parallel relationship with the magnetic field of one of said resonant modes associated with said electromagnetic field, and in intersecting relationship with the magnetic field of the other of said two resonant modes associated with said electromagnetic field.

6. In an electrical system, a resonant cavity, means for establishing within said cavity an electromagnetic field associated with at least two distinct modes of resonance of said cavity, means comprising an adjustable thin conductive member for altering the component of said electromagnetic field associated with one of said two modes of resonance while the component of said electromagnetic field associated with the other of said modes of resonance remains substantially unaffected, the path of adjustment of said conductive member being arranged parallel to the magnetic field of said last mentioned mode, whereby said electrical system is responsive to electrical signals of at least two distinct frequencies, one of said frequencies being fixed and the other tunable by adjustment of said conductive member.

7. In an electrical system, a cavity structure comprising two substantially symmetrical metal shells forming two resonating cavities, said shells being formed with an opening providing a communicating passage between said cavities, means for establishing an electromagnetic field within said cavity structure associated with at least two distinct modes of resonance thereof, the magnetic field of one of said resonant modes linking said two cavities through said opening and a slidable partition of thin highly conductive metal disposed in said opening, the path of adjustment of said partition being in a region where the lines of electromagnetic force due to said first mode are unaffected by the presence of said aperture, whereby adjustment of said partition along said path is operative to adjust one of the resonances of said cavity structure.

8. A resonator comprising two closed symmetrical and substantially cylindrical hollow cavities having common flat opposed surfaces in spaced relationship, said cavities being joined and formed with openings in the cylindrical walls thereof providing a communicating passage therebetween, electrical coupling means for introducing high frequency energy to said cavities and establishing therein an electromagnetic field associated with first and second distinct modes of resonance of said resonator, the first of said modes of resonance being characterized by magnetic fields confined wholly within said cavities, the second of said modes of resonance being characterized by a magnetic field linking said cavities through said passage, and means for varying the coupling between said cavities.

9. A resonator comprising two closed symmetrical and substantially cylindrical hollow cavities having opposed surfaces in spaced relationship, said cavities being joined and formed with openings in the cylindrical walls thereof providing a communicating passage therebetween, electrical coupling means for introducing high frequency energy to said cavities and establishing therein an electromagnetic field associated with first and second distinct modes of resonance of said resonator, the first of said modes of resonance being characterized by magnetic fields confined wholly within said cavities, the second of said modes of resonance being characterized by a magnetic field linking said cavities through said passage, and means for varying the coupling between said cavities, said means comprising a thin conductive partition lying in a plane perpendicular to said opposed surfaces and adjustable within said passage, the path of adjustment of said partition being normal to the magnetic field of said second mode of resonance within said passage, whereby adjustment of said partition along said path is operative to adjust the frequency of said first mode of resonance is substantially unaffected.

10. A resonator comprising two closed symmetrical and substantially cylindrical hollow cavities having opposed surfaces in spaced relationship, said cavities being joined and formed with openings in the cylindrical walls thereof providing a communicating passage therebetween, electrical coupling means for introducing high frequency energy to said cavities and establishing therein an electromagnetic field associated with first and second distinct modes of resonance of said resonator, the first of said modes of resonance being characterized by magnetic fields confined wholly within said cavities, the second of said modes of resonance being characterized by a magnetic field linking said cavities through said passage, and a plane conductive partition adjustable in a plane through said passage normal to said opposed surfaces for adjusting the frequency of said second mode of resonance while the frequency of said first mode of resonance is substantially unaffected.

11. In an electrical system, a resonant cavity structure, means for introducing high frequency electrical energy into said cavity for establishing an electromagnetic field therein associated with two distinct modes of resonance of said cavity, means comprising an adjustable thin conductive member for altering the component of said electromagnetic field characterizing one of said two modes of resonance while the component of said electromagnetic field characterizing the other of said modes of resonance remains substantially unaffected, whereby adjustment of said member is operative to tune one frequency of response of said cavity while another frequency of response remains substantially fixed.

WILLIAM E. BRADLEY.

REFERENCES CITED

The following references are of record in the file of this patent:

UNITED STATES PATENTS

| Number | Name | Date |
| --- | --- | --- |
| 2,239,905 | Trevor | Apr. 29, 1941 |
| 2,259,690 | Hansen et al. | Oct. 21, 1941 |
| 2,280,824 | Hansen et al. | Apr. 28, 1942 |
| 2,284,405 | McArthur | May 26, 1942 |
| 2,306,282 | Samuel | Dec. 22, 1942 |
| 2,314,794 | Linder | Mar. 23, 1943 |
| 2,356,414 | Linder | Aug. 22, 1944 |
| 2,357,313 | Carter | Sept. 5, 1944 |
| 2,396,044 | Fox | Mar. 5, 1946 |